United States Patent
Ishihara et al.

(10) Patent No.: US 7,494,710 B2
(45) Date of Patent: Feb. 24, 2009

(54) FINE METAL PARTICLES SUITABLE FOR FORMING A CONDUCTIVE COATING FILM

(75) Inventors: Yoichi Ishihara, Fukuoka (JP);
Toshiharu Hirai, Fukuoka (JP)

(73) Assignee: JGC Catalysts and Chemicals Ltd. (JP)

( * ) Notice: Subject to any disclaimer, the term of this patent is extended or adjusted under 35 U.S.C. 154(b) by 346 days.

(21) Appl. No.: 10/473,052

(22) PCT Filed: Mar. 25, 2002

(86) PCT No.: PCT/JP02/02852

§ 371 (c)(1),
(2), (4) Date: Sep. 29, 2003

(87) PCT Pub. No.: WO02/081131

PCT Pub. Date: Oct. 17, 2002

(65) Prior Publication Data

US 2004/0112175 A1    Jun. 17, 2004

(30) Foreign Application Priority Data

Mar. 30, 2001    (JP) ............................ P2001-100356

(51) Int. Cl.
*B32B 5/16*    (2006.01)
(52) U.S. Cl. .................. 428/402; 428/403; 428/404; 428/405; 428/406; 252/512; 427/212
(58) Field of Classification Search ................ 428/402, 428/403, 404, 405, 406, 407; 252/512; 427/212
See application file for complete search history.

(56) References Cited

U.S. PATENT DOCUMENTS

| 6,086,790 | A | | 7/2000 | Hayashi et al. |
| 6,136,228 | A | * | 10/2000 | Hirai et al. ............... 252/512 |
| 6,180,030 | B1 | | 1/2001 | Hirai et al. |

FOREIGN PATENT DOCUMENTS

| JP | 1-180619 | A | | 7/1989 |
| JP | 3-245405 | A | | 11/1991 |
| JP | 3245405 | A | * | 11/1991 |
| JP | 4-323310 | A | | 11/1992 |
| JP | 04323310 | | * | 11/1992 |
| JP | 05-105921 | A | | 4/1993 |
| JP | 6-311519 | A | | 11/1994 |
| JP | 7179904 | A | | 7/1995 |
| JP | 2001-49301 | A | | 2/2001 |
| JP | 2001049301 | A | | 2/2001 |
| JP | 2001-68322 | A | | 3/2001 |

OTHER PUBLICATIONS

R. Rivera-Noriega et al, "Oxygen reduction on RuFe cluster electrocatalyst in acid electrolyte" International Jurnal of Hydrogen Enegy 27 (2002) 457-460.*
JP 10-188681, English Abstract, "Coating Liquid for Forming Transparent Conductive Coating"; Inventors: Kumazawa Mitsuaki et al.; Publication date: Oct. 24, 2000; equivalent to U.S. Pat. No. 6,136,228.
TRC R& D Library, Toray Research Center, Inc., edited and published by Chosa Kenkyu Bumon, "Muki Nano-biryushi no Shintenkai", Aug. 1, 1999 (p. 6).
Biruyshi Handbook, edited by Genji Jimbo et al., published by Asakura Shoten, Sep. 1, 1991, p. 68.
Esumi, Kunio et al., "Preparation of Colloidal Silver-Palladium Alloys by UV-Irradiation in Mixtures of Acetone and 2-Propanol", *Elsevier Science B.V. Colloids and Surfaces*, A: Physicochemical and Engineering Aspects 109 (1996), pp. 55-66.
Silvert, P.-Y. et al., "Synthesis and Characterization of Nanoscale Ag-Pd Alloy Particles", *NanoStructured Materials*, vol. 7, No. 6, pp. 611-618 (1996), Elsevier Science Ltd.
Rivera-Noriega, R. et al., "Oxygen Reduction on Ru$x$Fe$y$ Cluster Electrocatalyst in Acid Electrolyte", *International Journal of Hydrogen Energy*, 27 (2002) pp. 457-460, publ. Elsevier Science Ltd.

* cited by examiner

*Primary Examiner*—Leszek Kiliman
(74) *Attorney, Agent, or Firm*—The Webb Law Firm

(57) ABSTRACT

Fine metal particles are provided having surface resistance as low as about $10^2$ to $10^4$ $\Omega/\square$, with excellent antistatic properties, anti-reflection properties, and electromagnetic shielding properties, and suitable for use in forming a transparent conductive coating film excellent in reliability and durability, and a process for producing the fine metal particles. The fine metal particles include iron and noniron metal having an average particle diameter in the range of from 1 to 200 nm and an iron content in the range of from 0.1 to 3.0% by weight. The noniron metal preferably is one or more metals selected from the group consisting of Au, Ag, Pd, Pt, Rh, Ru, Cu, Ni, Co, Sn, Ti, In, Al, Ta, and Sb. Part of the surface of the fine metal particles may be in the form of an oxide and/or a hydroxide.

4 Claims, No Drawings

FINE METAL PARTICLES SUITABLE FOR FORMING A CONDUCTIVE COATING FILM

BACKGROUND OF THE INVENTION

1. Field of the Invention

The present invention relates to fine metal particles which have excellent electrical conductivity because iron is contained therein in a specific amount and which have excellent dispersion stability and are less apt to suffer ionization, particle growth, or the like in conductive coating films, and to a coating liquid for forming transparent conductive coating films which contains the fine metal particles and has a long pot life. The invention further relates to a substrate with transparent conductive coating film which is obtained with the coating liquid for forming transparent conductive coating films and is excellent in antistatic properties, electromagnetic shielding properties, reliability, and durability. The invention furthermore relates to a display device having a front panel comprising the substrate with transparent conductive coating film.

2. Description of Related Art

A transparent coating film having the functions of preventing static buildup and preventing reflection has hitherto been formed on a surface of the transparent substrate of a display panel for cathode ray tubes, fluorescent character display tubes, or liquid-crystal displays for the purposes of preventing static buildup and reflection on the surface.

Incidentally, influences of electromagnetic waves emitted from cathode ray tubes and the like on the human body have recently become a problem. Besides the prevention of static buildup and reflection for which measures have been taken, it is desired to shield from those electromagnetic waves and to diminish the electromagnetic field produced by the emission of electromagnetic waves.

One method for shielding from those electromagnetic waves or the like is to form a conductive coating film for electromagnetic wave shielding on a surface of the display panel of a cathode ray tube or the like. However, the conductive coating film for electromagnetic shielding has been required to have a surface resistance as low as $10^2$ to $10^4$ $\Omega/\square$, in contrast to the existing antistatic conductive coating films for which a surface resistance of about $10^7$ $\Omega/\square$ or lower suffices.

When a coating liquid containing a conductive oxide heretofore in use, such as Sb-doped tin oxide or Sn-doped indium oxide, is used for forming a conductive coating film having such a low surface resistance, it is necessary that the film is formed in a larger thickness than in the case of existing antistatic coating films. However, since a conductive coating film produces an anti-reflection effect only when it has a thickness of about from 10 to 200 nm, use of an existing conductive oxide such as Sb-doped tin oxide or Sn-doped indium oxide results in a coating film having heightened surface resistance. There has hence been a problem that it is difficult to obtain a conductive coating film having not only excellent electromagnetic wave shielding properties but excellent anti-reflection properties.

Another method for forming a conductive coating film having low surface resistance is to use a conductive-film-forming coating liquid containing fine particles of a metal such as Ag to form on a surface of a substrate a coating film containing the fine metal particles. In this method, a dispersion of colloidal fine metal particles in a polar solvent is used as the film-forming coating liquid containing fine metal particles. In such coating liquids, the surface of the fine metal particles has been treated with an organic stabilizer such as poly(vinyl alcohol), polyvinylpyrrolidone, or gelatin in order to improve the dispersibility and stability of the colloidal fine metal particles. However, the conductive coating film formed from such a film-forming coating liquid containing fine metal particles has a drawback that since the fine metal particles in the coating film are in contact with one another through the organic stabilizer, the interparticulate resistance is high and, hence, the surface resistance of the coating film cannot be low. It is therefore necessary to conduct burning at a temperature as high as about 400° C. after the film formation to decompose and remove the stabilizer. However, the burning at high temperatures for decomposition and removal of the stabilizer encounters a problem that fusion and aggregation of fine metal particles occur to thereby reduce the transparency of the conductive coating film and heighten the haze thereof. Furthermore, in the case of cathode ray tubes and the like, there also has been a problem that exposure to high temperatures cause deterioration.

The existing transparent conductive coating film containing fine particles of a metal such as Ag has further had a problem that metal oxidation and particle growth due to ionization may occur and, in some cases, corrosion occurs, whereby the coating film is reduced in conductivity or light transmittance to impair the reliability of the display device.

The applicant proposed in, e.g., JP-A-10-188681 a coating liquid for forming transparent conductive coating films which contains fine composite metal particles comprising two or more metals and having an average particle diameter of from 1 to 200 nm. However, with such fine composite metal particles, it has been difficult to obtain a coating liquid having a sufficiently long pot life.

The present inventors made further investigations on fine metal particles. As a result, they have found that when a specific amount of Fe is incorporated into fine metal particles, the coating liquid for forming transparent conductive coating films has enhanced stability and gives a transparent conductive coating film having excellent durability. The invention has been thus completed.

In JP-A-11-80619,there is a description to the effect that when a slight amount of Fe is contained as an impurity, then the transparent conductive coating film formed has a more even distribution of conductivity in the surface and has lower resistance. JP-A-11-80619 further contains a description to the effect that the content of Fe in the fine metal particles is in the range of from 0.0020 to 0.015% by weight. There also is a description to the effect that film-forming properties become poor as the content of Fe increases. However, the fine metal particles described in JP-A-11-80619 have had a problem that the coating liquid has insufficient stability and gives a film having insufficient strength and poor durability.

An object of the invention is to overcome the problems of the related art described above and to provide fine metal particles which have a surface resistance as low as about $10^2$ to $10^4$ $\Omega/\square$, are excellent in antistatic properties, anti-reflection properties, and electromagnetic shielding properties, and are suitable for use in forming a transparent conductive coating film excellent in reliability and durability. Another object is to provide a process for producing the fine metal particles, a coating liquid for forming transparent conductive coating films which contains the fine metal particles, a substrate with transparent conductive coating film, and a display device having the coated substrate.

SUMMARY OF THE INVENTION

The fine metal particles according to the invention are fine metal particles comprising iron and noniron metal, and are characterized by having an average particle diameter in the range of from 1 to 200 nm and an iron content in the range of from 0.1 to 3.0% by weight.

The noniron metal preferably is one or more metals selected from the group consisting of Au, Ag, Pd, Pt, Rh, Ru, Cu, Ni, Co, Sn, Ti, In, Al, Ta, and Sb.

Part of the surface of the fine metal particles preferably is in the form of an oxide and/or a hydroxide. An aqueous dispersion in which the concentration of the fine metal particles is 0.5% by weight preferably has a flow electrical current potential in the range of from 50 to 300 μeq/g.

The process for producing fine metal particles according to the invention is characterized by reducing a salt of iron and a salt of one or more noniron metals in a solvent comprising water and/or an organic solvent in the presence of a reducing agent in such a manner as to result in fine metal particles having an iron content in the range of from 0.1 to 3.0% by weight.

In this process, after fine metal particles are produced by reducing the iron salt and the salt of one or more noniron metals, an oxidizing agent may be further added to oxidize at least part of the surface of the fine metal particles.

The coating liquid for forming a transparent conductive coating film according to the invention is characterized by comprising the fine metal particles and a polar solvent.

The substrate with transparent conductive coating film according to the invention comprises a substrate, a transparent conductive fine-particle layer disposed on the substrate, and a transparent coating film formed on the transparent conductive fine-particle layer and having a lower refractive index than the transparent conductive fine-particle layer, and is characterized in that the transparent conductive fine-particle layer comprises the fine metal particles described above.

The display device according to the invention is characterized by having a front panel comprising the substrate with transparent conductive coating film as described above, the transparent conductive coating film being formed on the outer surface of the front panel.

DETAILED DESCRIPTION OF THE INVENTION

Fine Metal Particles

First, the fine metal particles according to the invention will be explained.

The fine metal particles according to the invention comprise iron and noniron metal. The iron and the noniron metal, which constitute the fine metal particles, may be in the form of an alloy in a state of solid solution or in the form of a eutectic, which is not in a state of solid solution. Alternatively, the metals may be in such a state that an alloy and a eutectic coexist. Preferred of fine metal particles of these kinds are fine metal particles made of an alloy in a solid-solution state. This is because such fine metal particles give a conductive coating film in which the fine metal particles are inhibited from suffering the particle growth caused by oxidation or ionization and which suffers little decrease in conductivity or light transmittance and gives a substrate with transparent conductive coating film which has high reliability.

The term "reliability" as used herein especially means reliability in production, namely, it means that products having sufficient performances (conductivity, transmittance, etc.) can be produced in high yield. Especially in the invention, this reliability is attained with a coating liquid having a long pot life (having satisfactory coating liquid stability). Usually, the case in which products having sufficient performances (conductivity, transmittance, etc.) are obtained in high yield is also regarded as high in (production) reliability regardless of the coating liquid.

Examples of the noniron metal in such fine metal particles include at least one metal selected from metals such as Au, Ag, Pd, Pt, Rh, Ru, Cu, Ni, Co, Sn, Ti, In, Al, Ta, and Sb.

Preferred combinations of metals in the fine metal particles according to the invention include Au—Fe, Ag—Fe, Pd—Fe, Pt—Fe, Rh—Fe, Ru—Fe, Cu—Fe, Ni—Fe, Co—Fe, Sn—Fe, Ti—Fe, In—Fe, Al—Fe, Ta—Fe, Sb—Fe, and the like, and further include Au—Cu—Fe, Ag—Pt—Fe, Ag—Pd—Fe, Au—Pd—Fe, Au—Rh—Fe, Pt—Pd—Fe, Pt—Rh—Fe, Cu—Co—Fe, Ru—Ag—Fe, Ni—Pd—Fe, Au—Cu—Ag—Fe, Ag—Cu—Pt—Fe, Ag—Cu—Pd—Fe, Ag—Au—Pd—Fe, Au—Rh—Pd—Fe, Ag—Pt—Pd—Fe, Ag—Pt—Rh—Fe, Cu—Co—Pd—Fe, and the like.

The average particle diameter of the fine metal particles according to the invention is in the range of from 1 to 200 nm, preferably from 2 to 70 nm. When the average particle diameter thereof is in the range of from 1 to 200 nm, a conductive coating film having high transparency can be obtained.

In case where the average particle diameter of the fine metal particles exceeds 200 nm, light absorption by the metals is enhanced and this makes the particle layer have a reduced light transmittance and an increased haze. Because of this, when a substrate with such coating film is used as the front panel of, e.g., a cathode ray tube, there are cases where the image produced has reduced resolution. In case where the average particle diameter of the fine metal particles is smaller than 1 nm, the surface resistance of, the particle layer increases abruptly and this may make it impossible to obtain a coating film having such a low resistance value as to enable the objects of the invention to be accomplished.

Furthermore, the content of iron in the fine metal particles is in the range of from 0.1 to 3.0% by weight, preferably from 0.2 to 2.0% by weight, based on the weight of the fine metal particles.

Fine metal particles containing iron in an amount within that range are capable of forming a transparent conductive fine-particle layer which has even conductivity and low resistance and is excellent in scratch strength and durability.

In case where the content of iron in the fine metal particles is lower than 0.1% by weight, an alloy-like property (the property of being less susceptible to ionization as compared with the pure metal) is weak, so that the noniron metal cannot be sufficiently inhibited from oxidizing or ionizing. There are hence cases where the fine metal particles suffer particle growth, resulting in a decrease in conductivity or light transmittance.

Iron contents in the fine metal particles exceeding 3.0% by weight are undesirable in that conductivity may decrease considerably although the degree of this conductivity decrease varies depending on the kind of the noniron metal.

In another embodiment, the fine metal particles described above may be ones in which part of the surface thereof is in the form of an oxide and/or a hydroxide. These fine metal particles preferably are ones in which at least 25% of the surface is covered with an oxide and/or a hydroxide.

The fine metal particles covered with an oxide and/or a hydroxide in a degree within that range have high dispersibility. Because of this, a coating liquid having a long pot life can be obtained therefrom without using an organic stabilizer. In case where the proportion of the oxide and/or hydroxide coating film on the surface of the fine metal particles is lower than 25%, it is difficult to obtain a stable fine-metal-particle dispersion, or a coating liquid for forming transparent conductive coating films which has a long pot life, without using an organic stabilizer or the like. Fine metal particles in which inner parts thereof have been oxidized into an oxide and/or hydroxide are undesirable in that they do not have improved stability but tend to have reduced conductivity.

From the standpoint of dispersibility, the fine metal particles according to the invention desirably are ones which give an aqueous dispersion which, when having a fine-particle concentration (percent by weight: the number of grams of fine metal particles in 100 g of the dispersion) of 0.5% by weight, has a flow electrical current potential in the range of from 50 to 300 μeq/g, preferably from 60 to 200 μeq/g. When the flow electrical current potential thereof is in this range, the fine metal particles have excellent dispersion stability like colloidal metal oxide particles, such as colloidal silica, and do not aggregate in a coating liquid. Consequently, a coating liquid for forming transparent conductive coating films which has a long pot life can be obtained therefrom without using a large amount of an organic stabilizer as in coating liquids containing fine metal particles heretofore in use. Fine metal particles for which the flow electrical current potential is lower than 50 μeq/g cannot give a stable fine-metal-particle dispersion, or a coating liquid for forming transparent conductive coating films having a long pot life, without using an organic stabilizer or the like. In case where the charge quantity by streaming current titration is higher than 300 μeq/g, the fine metal particles tend to have reduced conductivity.

Charge quantity by streaming current titration is measured with a flow electrical current potential meter (PCD 03PH, manufactured by Mutec) or the like. This measurement of charge quantity by streaming current titration is made on an aqueous dispersion having a fine-particle concentration of 0.5% by weight.

Such fine metal particles in which at least part of the surface of the fine metal particles is in the form of an oxide and/or hydroxide of the metals or such fine metal particles which give an aqueous dispersion which, when having a fine-particle concentration of 0.5% by weight, has a charge quantity by streaming current titration in the range of from 50 to 300 μeq/g are inhibited from suffering metal oxidation in inner parts of the fine metal particles and from undergoing ionization and the resultant growth of fine metal particles. Such fine metal particles hence do not cause corrosion of the substrate or other materials. Because of this, the coating film suffers little decrease in conductivity or light transmittance and, as a result, a highly reliable substrate with transparent conductive coating film and a highly reliable display device can be obtained. Furthermore, since these fine metal particles are excellent in dispersibility and stability, the amount of an organic stabilizer to be used can be reduced and the removal of the organic stabilizer after coating film formation is easy. The organic stabilizer can hence be inhibited from remaining to impair conductivity. In addition, there is no need of burning the substrate at a temperature as high as 400° C. or above after coating film formation in order to remove the organic stabilizer as in related-art techniques, and the organic stabilizer can be removed at a low temperature. Consequently, not only the aggregation and/or fusion of fine metal particles which occurs in high-temperature burning can be prevented, but also the coating film obtained can be prevented from having an impaired haze.

Since the fine metal particles according to the invention described above contain iron in a specific amount, they retain high conductivity and have strong alloy-like properties. Consequently, when the fine metal particles are used to form a conductive coating film, the noniron metal can be inhibited from oxidizing or ionizing and particle growth is inhibited, whereby conductivity and light transmittance can be inhibited from decreasing. Furthermore, use of such fine metal particles makes it possible to obtain a stable fine-metal-particle dispersion or a coating liquid for forming transparent conductive coating films which has a long pot life.

The fine metal particles according to the invention can be produced by a known method (see *Physicochemical and Engineering Aspects* 109(1995) 55-62; *NanoStructured Materials*, Vol.7, No. 6, pp.611-618 (1996); or JP-A-10-188681 (corresponding to U.S. Pat. Nos. 6,136,228 and 6,180,030)), except that a salt of iron is used so as to obtain fine metal particles having an iron content of from 0.1 to 3.0% by weight. For example, the particles can be produced by the following production process.

Process for Producing Fine Metal Particles

A salt of iron and a salt of one or more noniron metals are reduced in a solvent comprising water and/or an organic solvent in the presence of a reducing agent in such a manner as to result in fine metal particles having an iron content in the range of from 0.1 to 3.0% by weight. Specifically, examples of this process include the following methods (i), (ii) and (iii).

Method (i)

This method comprises simultaneously reducing a salt of iron and a salt of noniron metal in a solvent comprising water and/or an organic solvent in the presence of a reducing agent.

Although the iron may be either ferric iron (trivalent) or ferrous iron (bivalent), it is especially preferably ferric iron.

Examples of the salt of iron include salts such as iron chloride, iron nitrate, iron sulfate, and organic acid salts, e.g., iron acetate, and mixtures of these salts.

Examples of the salt of noniron metal include the chlorides, nitrates, sulfates, and organic acid salts, e.g., acetates, of metals such as Au, Ag, Pd, Pt, Rh, Ru, Cu, Ni, Co, Sn, Ti, In, Al, Ta, and Sb and mixtures of these salts. Specific examples thereof include chloroauric acid, silver nitrate, palladium chloride, palladium nitrate, palladium acetate, ruthenium chloride, nickel chloride, nickel nitrate, copper nitrate, copper chloride, copper citrate, titanium tetrachloride, indium chloride, indium nitrate, and the like and mixtures of these. The organic acid salts herein include carboxylic acid salts, polycarboxylic acid salts, and the like.

In the solvent comprising water and/or an organic solvent, the concentration of the salt of iron and the salt of noniron metal is preferably in the range from 0.1 to 3.0% by weight, more preferably from 0.2 to 2.0% by weight, in terms of total concentration of the metals (percent by weight: the number of grams of the metals in 100 g of the solution).

As the organic solvent may be used alcohols such as 4-hydroxy-4-methyl-2-pentanone and tetrahydrofuryl alcohol and ethers such as propylene glycol monomethyl ether and diethylene glycol monoethyl ether. In the invention, the solvent may consist of a single solvent or a mixture of two or more solvents, and may be a mixed solvent composed of an organic solvent and water.

In case where the concentration of the salt of iron and the salt of noniron metal is lower than 0.1% by weight in terms of total concentration of the metals to be yielded, the rate of generation of fine metal particles tends to be low or the fine metal particles obtained tend to have uneven particle diameters. In addition, there are cases where the yield of fine metal particles is considerably low.

In case where the concentration of the salt of iron and the salt of noniron metal exceeds 3.0% by weight in terms of total concentration of the metals, the reduction and precipitation of metal ions proceed too quickly and this tends to give fine metal particles which have uneven particle diameters or have aggregated.

Examples of the reducing agent include ferrous sulfate, ammonium ferrous sulfate, ferrous oxalate, trisodium citrate, tartaric acid, L(+)-ascorbic acid, sodium borohydride, sodium hypophosphite, and the like. When sodium borohydride or sodium hypophosphite is used as a reducing agent, B or P undesirably comes into the fine metal particles. However, use of an iron salt such as ferrous sulfate or ammonium ferrous sulfate as a reducing agent can yield highly conductive fine metal particles containing neither B nor P. In the invention, the salt of iron (ferric salt) to be used for constituting the fine metal particles for constituting fine metal particles is distinctly distinguished from the salt of iron (ferrous salt) to be used as a reducing agent. Almost all the salt of iron used for constituting fine metal particles participates in the constitution of fine metal particles, whereas the salt of iron used as a reducing agent hardly participates in the constitution of fine metal particles and is usually removed by an operation such as washing. However, the iron salt used as a reducing agent can also become, upon oxidation, one for constituting fine metal particles, although these two iron salts should be distinctly distinguished as salts having different functions.

The amount of the reducing agent to be used here is in the range of preferably from 0.1 to 5.0 mol, more preferably from 1.0 to 3.0 mol, per mol of the sum of the salt of iron and the salt of noniron metal. As long as the amount of the reducing agent is within this range, fine metal particles having high conductivity can be obtained in high yield.

In case where the amount of the reducing agent is smaller than 0.1 mol per mol of the sum of the metal salts, the yield of fine metal particles is reduced because of the insufficient reducing ability and the fine metal particles obtained may have an iron content lower than 0.1% by weight. Namely, there are cases where the effect of the iron-containing fine metal particles according to the invention is not obtained. Even when the amount of the reducing agent exceeds 5.0 mol per mol of the sum of the metal salts, not only the yield is not improved any more, but also fine metal particles containing B or P in a large amount are obtained according to the kind of the reducing agent. Such fine metal particles have insufficient conductivity.

Conditions for the reduction with such a reducing agent are not particularly limited as long as the metal salts can be reduced. The reduction may be accomplished by adding the reducing agent to the metal salts prepared in the concentration shown above and optionally heating or stirring the mixture according to need.

An organic stabilizer can be further used in the invention according to need. Examples of the organic stabilizer include gelatin, poly(vinyl alcohol), poly(acrylic acid), hydroxypropyl cellulose, polycarboxylic acids such as oxalic acid, malonic acid, succinic acid, glutaric acid, adipic acid, sebacic acid, maleic acid, fumaric acid, phthalic acid, and citric acid and salts of these acids, heterocyclic compounds such as vinylpyrrolidone and polyvinylpyrrolidone, mixtures of these, and the like.

The timing of addition of the organic stabilizer is not particularly limited, and the stabilizer may be added either before or simultaneously with or after the addition of the reducing agent.

The amount of such an organic stabilizer to be used may be such that the organic stabilizer is contained in an amount of from 1 to 10 mol, preferably from 2 to 8 mol, per mol of the fine metal particles to be yielded.

In case where the amount of the organic stabilizer is less than 1 mol/mol-metals, the fine metal particles obtained may have insufficient dispersibility and aggregate. In case where the amount thereof exceeds 10 mol/mol-metals, the residual organic stabilizer may impair conductivity.

In this method of the invention, the dispersion of fine metal particles thus obtained through reduction may be heat-treated according to need in a pressure vessel at a temperature of about 100° C. or higher. This heat treatment yields fine metal particles having a more even particle diameter.

Besides method (i) described above, the following method (ii) can be used to prepare fine metal particles.

Method (ii)

This method comprises treating a dispersion of fine iron metal particles or fine particles of an iron-containing alloy by causing fine particles or ions of a metal having a higher standard hydrogen electrode potential than the fine iron metal particles or fine iron-containing alloy particles to be present in the dispersion to thereby deposit the noniron metal having a higher standard hydrogen electrode potential on the fine iron metal particles and/or fine iron-containing alloy particles.

The dispersion of fine iron metal particles or fine iron-containing alloy particles to be used in method (ii) is not particularly limited. However, a dispersion of fine particles of Fe, Ag—Pd—Fe, Ag—Fe, Ru—Fe, or the like may be used.

Such a dispersion can be prepared, for example, by reducing a metal salt of iron or a combination of a metal salt of iron with a salt of one or more noniron metals in the presence of a reducing agent. Use may be made of the dispersion of fine iron-containing metal particles prepared by method (i) described above.

In those fine metal particles, the difference in standard hydrogen electrode potential between the iron and the noniron metal which constitute the particles (the difference between the metal having a higher standard hydrogen electrode potential and iron, when two or more metals are contained) is desirably 0.05 eV or larger, preferably 0.1 eV or larger. In these fine metal particles, the metal having the highest standard hydrogen electrode potential is desirably present in an amount in the range of from 97 to 99.9% by weight based on the weight of the fine metal particles. When the content of the metal having the highest standard hydrogen electrode potential is lower than 97% by weight or higher than 99.9% by weight, there are cases where the effect of inhibiting the fine metal particles from oxidizing or ionizing is insufficient and no improvement in reliability is brought about.

This production method is suitable when the noniron metal is Au, Ag, Pd, Pt, Ph, Ru, Co, Sn, In, or the like.

As the reducing agent may be used those enumerated as examples for method (i) described above. Methods of reduction also are not particularly limited, and the reduction may be conducted in the same manner as that shown as an example for method (i) described above.

In method (ii) also, the organic stabilizers shown above may be used according to need, and the dispersion of fine metal particles obtained through reduction may be heat-treated according to need in a pressure vessel at a temperature of about 100° C. or higher.

The timing of addition of an organic stabilizer is not particularly limited, and the stabilizer may be added either before or simultaneously with or after the addition of the reducing agent.

Method (iii)

In the invention, an oxidizing agent may be subsequently added to the dispersion of fine metal particles thus obtained to thereby oxidize at least part of the surface of the fine metal particles (method (iii)).

This oxidation can yield fine metal particles whose surface is in the form of an oxide and/or a hydroxide. The surface may be either an oxide or a hydroxide or may be one in which a hydroxide and an oxide coexist.

As the oxidizing agent may be used, for example, oxygen, hydrogen peroxide, ozone, or the like.

The amount of the oxidizing agent to be added here, which varies depending on the kind of the oxidizing agent, is not particularly limited as long as at least part (about 25% or more) of the surface of the fine metal particles can be converted to an oxide and/or hydroxide of the metals. Specifically, the amount of the oxidizing agent may be in the range of from 0.01 to 0.2 mol, preferably from 0.02 to 0.15 mol, per mol of the sum of the metals.

In case where the amount of the oxidizing agent added is smaller than 0.01 mol, about 25% or more of the surface of the fine metal particles cannot be converted to an oxide and/or hydroxide of the metals and the fine metal particles cannot have a flow electrical current potential in the range of from 50 to 300 µeq/g. Namely, it is difficult to obtain a transparent conductive coating liquid having sufficient dispersion stability and a long pot life. Moreover, there are cases where conductivity and light transmittance are impaired, making it impossible to obtain a highly reliable substrate with conductive coating film or a highly reliable display device.

In case where the amount of the oxidizing agent added exceeds 0.2 mol there is a tendency for the fine metal particles to be oxidized not only in the surface thereof but also in inner parts thereof. There are hence cases where conductivity decreases considerably.

Conditions for the oxidation also are not particularly limited, and treatments such as heating and stirring may be conducted according to need.

[Coating Liquid for Forming Transparent Conductive Coating Film]

Next, the coating liquid of the invention for forming transparent conductive coating films will be explained.

The coating liquid of the invention for forming transparent conductive coating films comprises the fine metal particles described above and a polar solvent.

In the coating liquid for forming transparent conductive coating films, the fine metal particles are desirably contained in an amount of from 0.05 to 5% by weight, preferably from 0.1 to 2% by weight, based on the weight of the coating liquid.

Examples of the polar solvent to be used in the invention include water; alcohols such as methanol, ethanol, propanol, butanol, diacetone alcohol, furfuryl alcohol, tetrahydrofurfuryl alcohol, ethylene glycol, and hexylene glycol; esters such as the methyl ester of acetic acid and ethyl acetate ester; ethers such as diethyl ether, ethylene glycol monomethyl ether, ethylene glycol monoethyl ether, ethylene glycol monobutyl ether, diethylene glycol monomethyl ether, and diethylene glycol monoethyl ether; ketones such as acetone, methyl ethyl ketone, acetylacetone, and acetoacetic acid esters; and the like. These may be used alone or as a mixture of two or more thereof.

This coating liquid for forming transparent conductive coating films may contain conductive fine particles other than the fine metal particles described above.

As the conductive fine particles other than the fine metal particles can be used known ones such as fine particles of a transparent conductive inorganic oxide or a finely particulate carbon (see JP-A-63-11519 and U.S. Pat. No. 6,136,228).

Examples of the fine particles of a transparent conductive inorganic oxide include tin oxide, tin oxide doped with Sb, F, or P, indium oxide, indium oxide doped with Sn or F, antimony oxide, lowly oxidized titanium, and the like.

The average particle diameter of those conductive fine particles is desirably in the range of from 1 to 200 nm, preferably from 2 to 150 nm.

Such conductive fine particles may be contained in an amount of up to 4 parts by weight per part by weight of the fine metal particles. Amounts of the conductive fine particles exceeding 4 parts by weight are undesirable in that there are cases where conductivity is reduced to impair the electromagnetic wave shielding effect.

Incorporation of such conductive fine particles enables formation of a transparent conductive fine-particle layer having better transparency than the transparent conductive fine-particle layer constituted of fine metal particles alone. Furthermore, incorporation of the conductive fine particles enables the substrate with transparent conductive coating film to be produced at low cost.

A matrix ingredient serving as a binder for the fine metal particles after coating film formation may be contained in the coating liquid for forming transparent conductive coating films according to the invention. This matrix ingredient preferably is one comprising silica. Examples of the matrix ingredient include products of hydrolytic polycondensation of organosilicon compounds such as organosilicon compounds, silicic acid polycondensates obtained by dealkalizing aqueous solutions of alkali metal silicates, and resins for coating materials. The resins for coating materials may be either thermosetting resins or thermoplastic resins. Specific examples thereof include thermoplastic resins such as polyester resins, polycarbonate resins, polyamide resins, vinyl chloride resins, vinyl acetate resins, fluororesins, and thermoplastic acrylic resins, urethane resins, epoxy resins, melamine resins, butyral resins, phenolic resins, and the like. This matrix may be contained in an amount of from 0.01 to 0.5 parts by weight, preferably from 0.03 to 0.3 parts by weight, per part by weight of the fine metal particles.

An organic stabilizer may be contained in the coating liquid for forming transparent conductive coating films in order to further improve the dispersibility of the fine metal particles of the invention although it is not always necessary because the fine metal particles are excellent in dispersibility and stability. Examples of this organic stabilizer include gelatin, poly(vinyl alcohol), polyvinylpyrrolidone, poly(acrylic acid), hydroxypropyl cellulose, polycarboxylic acids such as oxalic acid, malonic acid, succinic acid, glutaric acid, adipic acid, sebacic acid, maleic acid, fumaric acid, phthalic acid, and citric acid and salts of these acids, heterocyclic compounds such as vinylpyrrolidone and polyvinylpyrrolidone, mixtures of these, and the like.

This organic stabilizer may be contained in an amount of from 0.005 to 0.5 parts by weight, preferably from 0.005 to 0.2 parts by weight, per part by weight of the fine metal particles. When the amount of the organic stabilizer is smaller than 0.005 parts by weight, there are cases where sufficient dispersibility and stability cannot be obtained. Even when the amount thereof exceeds 0.5 parts by weight, not only a further improvement in dispersibility or stability is not brought about, but also the organic stabilizer may remain in a larger amount to impair conductivity.

When this coating liquid for forming transparent conductive coating films is used, a transparent conductive fine-particle layer having a surface resistance of from $10^2$ to $10^4$ $\Omega/\square$ can be formed. This conductive layer is hence effective in shielding from electromagnetic waves and can effectively diminish the electromagnetic field produced by the emission of electromagnetic waves.

In particular, the fine metal particles the surface of which has been oxidized and which have a flow electrical current potential within a specific range are excellent in dispersibility and stability, and the coating liquid for forming transparent conductive coating films which contains such fine metal particles has a long pot life. When this coating liquid for forming transparent conductive coating films is used, a substrate with transparent conductive coating films can be obtained which is coated with a transparent conductive coating film excellent in conductivity and electromagnetic shielding properties and having high reliability. Furthermore, since these fine metal particles are excellent in dispersibility and stability, the amount of an organic stabilizer to be used can be reduced. As a result, the removal of the organic stabilizer after coating film formation is easy, and conductivity impairment by a residual organic stabilizer can be inhibited. In addition, there is no need of burning the substrate at a temperature as high as 400° C. or above after coating film formation in order to remove the organic stabilizer as in related-art techniques, and the organic stabilizer can be removed at a low temperature. Consequently, not only the aggregation or fusion of fine metal particles which occurs in high-temperature burning can be prevented, but also the coating film obtained can be prevented from having an impaired haze.

[Substrate with Transparent Conductive Coating Film]

The substrate with transparent conductive coating film according to the invention will be explained below.

In the substrate with transparent conductive coating film according to the invention, a transparent conductive fine-particle layer comprising the fine metal particles described above has been formed on a substrate such as, e.g., a film, sheet, or another molding made of a glass, plastic, ceramic, or the like.

(Transparent Conductive Fine-Particle Layer)

The thickness of the transparent conductive fine-particle layer is desirably in the range of about from 5 to 200 nm, preferably from 10 to 150 nm. As long as the thickness thereof is within this range, a substrate with transparent conductive coating film which has an excellent electromagnetic shielding effect can be obtained.

This transparent conductive fine-particle layer may contain conductive fine particles other than the fine metal particles described above, a matrix ingredient, and an organic stabilizer according to need. Examples of these ingredients are the same as those shown above.

(Transparent Coating Film)

In the substrate with transparent conductive coating film according to the invention, a transparent coating film having a lower refractive index than the transparent conductive fine-particle layer has been formed on the transparent conductive fine-particle layer.

The thickness of the transparent coating film is desirably in the range of from 50 to 300 nm, preferably from 80 to 200 nm. The refractive index of the transparent coating film is regulated to a value usually lower by about from 1.40 to 1.60 than the refractive index of the conductive fine-particle layer in order to impart anti-reflection performance.

This transparent coating film is formed, for example, from an inorganic oxide such as silica, titania, or zirconia or a composite oxide of them. Especially preferred for use as the transparent coating film in the invention is a silica-based coating film comprising a product of hydrolytic polycondensation of a hydrolyzable organosilicon compound or comprising a silicic acid polycondensate obtained by dealkalizing an aqueous solution of an alkali metal silicate. The substrate with transparent conductive coating film which has such a transparent coating film has excellent anti-reflection properties.

Additive such as fine particles constituted of a low-refractive-index material, e.g., magnesium fluoride, dyes, and pigments may be contained in the transparent coating film according to need.

(Process for Producing Substrate with Transparent Conductive-Coating Film)

The substrate with transparent conductive coating film according to the invention can be produced in the following manner.

(Formation of Transparent Conductive Fine-Particle Layer)

First, a coating liquid for forming transparent conductive coating films which comprises fine metal particles having an average particle diameter of from 1 to 200 nm and a polar solvent is applied to a substrate and dried to form a transparent conductive fine-particle layer.

The coating liquid for forming transparent conductive coating films to be used here comprises fine metal particles and a polar solvent. Examples of the fine metal particles and the polar solvent are the same as those shown above.

The fine metal particles are contained in the coating liquid for forming transparent conductive coating films desirably in an amount of from 0.05 to 5% by weight, preferably from 0.1 to 2% by weight, based on the weight of coating liquid.

Conductive fine particles other than the fine metal particles may have been added to this coating liquid for forming transparent conductive coating films. Examples of these conductive fine particles are the same as those shown above.

For forming the transparent conductive fine-particle layer, use may be made, for example, of a method which comprises applying the coating liquid for forming transparent conductive coating films to a substrate by a technique such as dipping, spinner coating, spraying, roll coating, or flexography and then drying the coating liquid at a temperature in the range of from ordinary temperature to about 90° C.

In the case where the coating liquid for forming transparent conductive coating films contains a matrix ingredient such as those shown above, a treatment for curing the matrix ingredient may be performed.

Examples of the curing treatment include techniques which have been known, such as thermal curing, electromagnetic wave irradiation, and curing with a gas such as ammonia gas.

The thickness of the transparent conductive fine-particle layer formed by the method described above is preferably in the range of about from 50 to 200 nm. As long as the thickness thereof is within this range, a substrate with transparent conductive coating film which has an excellent electromagnetic shielding effect can be obtained.

(Formation of Transparent Coating Film)

A coating liquid for transparent coating film formation is subsequently applied on the fine-particle layer to form, on the transparent conductive fine-particle layer, a transparent coating film having a lower refractive index than the fine-particle layer.

The thickness of the transparent coating film is desirably in the range of from 50 to 300 nm, preferably from 80 to 200 nm. When the thickness thereof is within this range, the coating film exhibits excellent anti-reflection properties. Methods for forming the transparent coating film are not particularly limited, and use may be made of a dry technique for thin film deposition, such as vacuum evaporation, sputtering, or ion plating, or a wet technique for thin film formation, such as dipping, spinner coating, spraying, roll coating, or flexography as mentioned above, according to the material of this transparent coating film.

When the transparent coating film is formed by a wet technique for thin film deposition, use can be made of a coating liquid for transparent coating film formation which has been known (see JP-A-10-188681 (corresponding to U.S. Pat. No. 6,136,228)). As such a coating liquid for transparent coating film formation may be used, for example, a coating liquid which contains an inorganic oxide such as silica, titania, or zirconia or a composite oxide of them as an ingredient for transparent coating film formation.

Preferred for use as the coating liquid for transparent coating film formation in the invention is a silica-based coating liquid for transparent coating film formation which contains either a product of hydrolytic polycondensation of a hydrolyzable organosilicon compound or a silicic acid solution obtained by dealkalizing an aqueous solution of an alkali metal silicate. Especially preferred is one containing a product of hydrolytic polycondensation of an organosilicon compound represented by the following general formula [1]. The silica-based coating film formed from this coating liquid has a lower refractive index than the conductive fine-particle layer comprising fine metal particles, and the substrate with transparent coating film obtained has excellent anti-reflection properties.

$$R_aSi(OR')_{4-a} \quad [1]$$

(In the formula, R is a vinyl group, aryl group, acrylic group, alkyl group having 1 to 8 carbon atoms, hydrogen atom, or halogen atom; R' is a vinyl group, aryl group, acrylic group, alkyl group having 1 to 8 carbon atoms, $-C_2H_4OC_nH_{2n+1}$ (n is 1 to 4), or hydrogen atom; and a is an integer of 0 to 3.)

Examples of this organosilicon compound include tetramethoxysilane, tetraethoxysilane, tetraisopropoxysilane, tetrabutoxysilane, tetraoctylsilane, methyltrimethoxysilane, methyltriethoxysilane, ethyltriethoxysilane, methyltriisopropoxysilane, vinyltrimethoxysilane, phenyltrimethoxysilane, dimethyldimethoxysilane, and the like.

One or more of those organosilicon compounds are hydrolyzed, for example, in a water/alcohol mixed solvent in the presence of an acid catalyst. Thus, a coating liquid for transparent coating film formation which contains a product of hydrolytic polycondensation of the organosilicon compounds is obtained. The concentration of the film-forming ingredient in this coating liquid (percent by weight: the number of grams of the film-forming ingredient in 100 g of the coating liquid) is preferably from 0.5 to 2.0% by weight in terms of oxide amount.

The coating liquid for transparent coating film formation to be used in the invention may further contain fine particles constituted of a low-refractive-index material, e.g., magnesium fluoride, conductive fine particles whose amount is small so as not to impair the transparency and anti-reflection performance of the transparent coating film, and/or additives such as a dye or pigment.

In the invention, the coating film formed by applying the coating liquid for transparent coating film formation may be heated to 150° C. or higher during drying or after drying. Alternatively, the uncured coating film may be irradiated with an electromagnetic wave having a shorter wavelength than visible rays, such as ultraviolet, electron beams, X-rays, or gamma-rays, or may be exposed to, an active gas atmosphere such as ammonia. This treatment promotes the curing of the film-forming ingredient to give a transparent coating film having enhanced hardness.

Furthermore, the film formation through application of the coating liquid for transparent coating film formation may be conducted in such a manner that the coating liquid for transparent coating film formation is applied while keeping the transparent conductive fine-particle layer at about from 40 to 90° C. and the transparent coating film is subjected to the treatments shown above (drying, heating, and curing). As a result, an antiglare substrate with transparent coating film and reduced glaringness is obtained which has ring-like protrusions and recesses formed on the surface of the transparent coating film.

Display Device

The substrate with transparent conductive coating film according to the invention has a transparent conductive fine-particle comprising specific fine metal particles. Because of this, the coated substrate has a surface resistance in the range of from $10^2$ to $10^4$ Ω/□, which is required for electromagnetic shielding, and has satisfactory anti-reflection performance in the visible ray region and near infrared region. This substrate with transparent conductive coating film is suitable for use as the front panel of a display device.

The display device according to the invention is a device which electrically produces images thereon, such as a cathode ray tube (CRT), fluorescent character display tube (FIP), plasma display (PDP), or liquid-crystal display (LCD), and is provided with a front panel comprising the substrate with transparent conductive coating film described above.

It is known that when display devices provided with conventional front panels are operated, electromagnetic waves are emitted from the front panels simultaneously with image production on the front panels. The display device according to the invention can shield from such electromagnetic waves and effectively diminish the electromagnetic field induced by the emission of such electromagnetic waves, because the front panel thereof comprises the substrate with transparent conductive coating film which has a surface resistance of from $10^2$ to $10^4$ Ω/□.

When a light reflection occurs on the front panel of a display device, the reflected light makes it difficult to see the image produced. However, in the display device according to the invention, such light reflections can be effectively prevented because the front panel comprises the substrate with transparent conductive coating film, which has sufficient anti-reflection performance in the visible ray region and near infrared region.

Furthermore, in the case of a cathode ray tube in which the front panel thereof comprises the substrate with transparent conductive coating film according to the invention and a small amount of a dye or pigment is contained in at least either of the layers constituting the transparent conductive coating film, i.e., the transparent conductive fine-particle layer and the overlying transparent coating film, the dye or pigment absorbs light having specific wavelengths. Thus, the contrast of images produced on the cathode ray tube can be improved.

EXAMPLES

The invention will be illustrated with reference to Examples, but the invention should not be construed as being limited to these Examples.

Example 1

To 100 g of pure water were added 9.6 g ($3.6 \times 10^{-2}$ mol) of palladium nitrate dihydrate and 0.1 g of iron citrate ($FeC_6H_5O_7$: $4.14 \times 10^{-4}$ mol) so as to result in the proportion by weight in terms of metal shown in Table 1. Thus, an aqueous solution of mixed metal salts was prepared. Subsequently, 200 g (0.218 mol: 6 mol/mol-metals) of an aqueous trisodium citrate solution was added as a stabilizer to this aqueous solution of mixed metal salts. Thereto was then added 81.2 g (7.3×10$^{-2}$ mol: 2 mol/mol-metals) of an aqueous solution containing ferrous sulfate in a concentration of 25% by weight as a reducing agent. This mixture was stirred at a temperature of 20° C. in a nitrogen atmosphere for 20 hours to prepare a dispersion of fine metal particles (P-1).

From the dispersion obtained, the fine metal particles were separated and recovered with a centrifugal separator. These fine metal particles were washed with 6.1 g of an aqueous solution containing hydrochloric acid in a concentration of 1% by weight (for desalting) and then dispersed in pure water to prepare an aqueous dispersion containing the fine metal particles (P-1) in a concentration of 2.5% by weight in terms of metal.

Subsequently, the aqueous dispersion of the fine metal particles (P-1) was treated with Nanomizer System (Nanomizer Co.: LA-33-S) to prepare an aqueous monodisperse dispersion of the fine metal particles (P-1) (dispersion in which the fine metal particles were dispersed in the aqueous dispersion medium without aggregating or precipitating). This dispersion was placed in a sealed vessel (rotary evaporator) the atmosphere in which had been replaced with nitrogen gas. The water was replaced with 4-hydroxy-4-methyl-2-pentanone. Thus, a 4-hydroxy-4-methyl-2-pentanone dispersion containing the fine metal particles (P-1) in a concentration of 4.0% by weight was prepared.

The fine metal particles (P-1) obtained were evaluated for average particle diameter after the Nanomizer treatment and for flow electrical current potential before the Nanomizer treatment. The results are shown in Table 1.

The average particle diameter of the fine metal particles was evaluated with a Microtrac particle size analyzer (9340-UPA, manufactured by Nikkiso Co., Ltd.). Charge quantity by streaming current titration was determined by diluting the aqueous dispersion containing fine metal particles (P-1) in a concentration of 2.5% by weight to 0.5% by weight and titrating the diluted dispersion with a titrant (0.001 N Poly-Dadmac solution, manufactured by Metron) using a flow electrical current potential meter (PCD-03-PH, manufactured by Mutec).

Example 2

To 100 g of pure water were added 6.12 g (3.6×10$^{-2}$ mol) of an aqueous silver nitrate solution and 0.1 g (4.2×10$^{-4}$ mol) of an aqueous iron citrate solution so as to result in the proportion by weight in terms of metal shown in Table 1. Thus, an aqueous solution of mixed metal salts was prepared. Subsequently, 200 g (0.219 mol: 6 mol/mol-metals) of trisodium citrate having a concentration of 30% by weight was added as a stabilizer to this aqueous solution of mixed metal salts. Thereto was then added 76.5 g (3.64×10$^{-2}$ mol/mol-metals) of an aqueous solution containing ferrous sulfate in a concentration of 25% by weight as a reducing agent. This mixture was stirred at a temperature of 20° C. in a nitrogen atmosphere for 20 hours to prepare a dispersion of fine metal particles (P-2).

From the dispersion obtained, the fine metal particles were separated and recovered with a centrifugal separator. These fine metal particles were washed with 6.1 g of an aqueous solution containing hydrochloric acid in a concentration of 1% by weight and then dispersed in pure water to prepare an aqueous dispersion containing the fine metal particles (P-2) in a concentration of 2.5% by weight in terms of metal.

Subsequently, the aqueous dispersion of the fine metal particles (P-2) was treated with Nanomizer System to prepare an aqueous monodisperse dispersion of the fine metal particles (P-2). This dispersion was placed in a rotary evaporator the atmosphere in which had been replaced with nitrogen gas. Thereafter, the water was replaced with 4-hydroxy-4-methyl-2-pentanone. Thus, a 4-hydroxy-4-methyl-2pentanone dispersion containing the fine metal particles (P-2) in a concentration of 4.0% by weight was prepared.

The fine metal particles (P-2) obtained were evaluated for average particle diameter and charge quantity by streaming current titration in the same manners as in Example 1. The results are shown in Table 1.

Example 3

To 100 g of pure water were added 8.53 g (3.2×10$^{-2}$ mol) of palladium nitrate dihydrate, 0.34 g (0.2×10$^{-2}$ mol) of silver nitrate, and 0.094 g (3.91×10$^{-4}$ mol) of an aqueous iron citrate solution so as to result in the proportion by weight in terms of metal shown in Table 1. Thus, an aqueous solution of mixed metal salts was prepared. Subsequently, 189 g (0.206 mol: 6 mol/mol-metals) of an aqueous solution containing trisodium citrate in a concentration of 30% by weight was added as a stabilizer to this aqueous solution of mixed metal salts. Thereto was then added 76.5 g (6.88×10$^{-2}$ mol: 2 mol/mol-metals) of an aqueous solution containing ferrous sulfate in a concentration of 25% by weight as a reducing agent. This mixture was stirred at a temperature of 20° C. in a nitrogen atmosphere for 20 hours to prepare a dispersion of fine metal particles (P-3).

From the dispersion obtained, the fine metal particles were separated and recovered with a centrifugal separator. These fine metal particles were washed with 6.1 g of an aqueous solution containing hydrochloric acid in a concentration of 1% by weight and then dispersed in pure water to prepare an aqueous dispersion containing the fine metal particles (P-3) in a concentration of 2.5% by weight in terms of metal.

Subsequently, the aqueous dispersion of the fine metal particles (P-3) was treated with Nanomizer System to prepare an aqueous monodisperse dispersion of the fine metal particles (P-3). This dispersion was placed in a rotary evaporator the atmosphere in which had been replaced with nitrogen gas. Thereafter, the water was replaced with 4-hydroxy-4-methyl-2-pentanone. Thus, a 4-hydroxy-4-methyl-2-pentanone dispersion containing the fine metal particles (P-3) in a concentration of 4.0% by weight was prepared.

The fine metal particles (P-3) obtained were evaluated for average particle diameter and charge quantity by streaming current titration in the same manners as in Example 1. The results are shown in Table 1.

Example 4

To 100 g of pure water were added 9.6 g (3.6×10$^{-2}$ mol) of palladium nitrate dihydrate and 0.165 g (6.87×10$^{-4}$ mol) of an aqueous iron citrate solution so as to result in the proportion by weight in terms of metal shown in Table 1. Thus, an aqueous solution of mixed metal salts was prepared. Subsequently, 202 g (0.22 mol: 6 mol/mol-metals) of trisodium citrate having a concentration of 30% by weight was added as a stabilizer to this aqueous solution of mixed metal salts. Thereto was then added 81.6 g (7.34×10$^{-2}$ mol: 2 mol/mol-metals) of an aqueous solution containing ferrous sulfate in a concentration of 25% by weight as a reducing agent. This mixture was stirred at a temperature of 20° C. in a nitrogen atmosphere for 20 hours to prepare a dispersion of fine metal particles (P-4).

From the dispersion obtained, the fine metal particles were separated and recovered with a centrifugal separator. These fine metal particles were washed with 6.1g of an aqueous solution containing hydrochloric acid in a concentration of 1% by weight and then dispersed in pure water to prepare an aqueous dispersion containing the fine metal particles (P-4) in a concentration of 2.5% by weight in terms of metal.

Subsequently, the aqueous dispersion of the fine metal particles (P-4) was treated with Nanomizer System to prepare an aqueous monodisperse dispersion of the fine metal particles (P-4). This dispersion was placed in a rotary evaporator the atmosphere in which had been replaced with nitrogen gas. Thereafter, oxygen was forced thereinto as an oxidizing agent in an amount of 0.02 mol per mol of the fine metal particles (sum of the metals) to prepare, with stirring, an aqueous dispersion containing fine metal particles (P-4) in a concentration of 2.5% by weight in which the surface of the fine metal particles (P-4) was partly in the form of an oxide and/or a hydroxide.

Subsequently, the water was replaced with 4-hydroxy-4-methyl-2-pentanone. Thus, a 4-hydroxy-4-methyl-2-pentanone dispersion containing the partly surface-oxidized fine metal particles (P-4) in a concentration of 4.0% by weight was prepared.

The fine metal particles (P-4) obtained were evaluated for average particle diameter and charge quantity by streaming current titration with respect to the aqueous dispersion after oxidation. The results are shown in Table 1.

Example 5

An aqueous; dispersion containing fine metal particles (P-1) in a concentration of 2.5% by weight in terms of metal was prepared in the same manner as in Example 1.

Subsequently, the aqueous dispersion of the fine metal particles (P-1) was treated with Nanomizer System to prepare an aqueous monodisperse dispersion of the fine metal particles (P-1). This dispersion was placed in a rotary evaporator the atmosphere in which had been replaced with nitrogen gas. Thereafter, oxygen was forced thereinto as an oxidizing agent in an amount of 0.1 mol per mol of the fine metal particles (sum of the metals) to prepare, with stirring, an aqueous dispersion containing fine metal particles (P-5) in a concentration of 2.5% by weight in which the surface of the fine metal particles (P-1) was partly in the form of an oxide and/or a hydroxide.

Subsequently, the water was replaced with 4-hydroxy-4-methyl-2-pentanone. Thus, a 4-hydroxy-4-methyl-2-pentanone dispersion containing the partly surface-oxidized fine metal particles (P-5) in a concentration of 4.0% by weight was prepared.

The fine metal particles (P-5) obtained were evaluated for average particle diameter and charge quantity by streaming current titration with respect to the aqueous dispersion after oxidation. The results are shown in Table 1.

Example 6

To 100 g of pure water were added 9.6 g ($3.6 \times 10^{-2}$ mol) of palladium nitrate dihydrate and 0.184 g ($7.63 \times 10^{-4}$ mol) of iron citrate so as to result in the proportion by weight in terms of metal shown in Table 1. Thus, an aqueous solution of mixed metal salts was prepared. Subsequently, 203 g (0.221 mol: 6 mol/mol-metals) of an aqueous solution containing trisodium citrate in a concentration of 30% by weight was added as a stabilizer to this aqueous solution of mixed metal salts. Thereto was then added 81.8 g ($7.35 \times 10^{-2}$ mol: 2 mol/mol-metals) of an aqueous solution containing ferrous sulfate in a concentration of 25% by weight as a reducing agent. This mixture was stirred at a temperature of 20° C. in a nitrogen atmosphere for 20 hours to prepare a dispersion of fine metal particles (P-6).

From the dispersion obtained, the fine metal particles were separated and recovered with a centrifugal separator. These fine metal particles were washed with 6.1 g of an aqueous solution containing hydrochloric acid in a concentration of 1% by weight and then dispersed in pure water to prepare an aqueous dispersion containing the fine metal particles (P-6) in a concentration of 2.5% by weight in terms of metal.

Subsequently, the aqueous dispersion of the fine metal particles (P-6) was treated with Nanomizer System to prepare an aqueous monodisperse dispersion of the fine metal particles (P-6). This dispersion was placed in a rotary evaporator the atmosphere in which had been replaced with nitrogen gas. Thereafter, oxygen was forced thereinto as an oxidizing agent in an amount of 0.02 mol per mol of the fine metal particles (sum of the metals) to prepare, with stirring, an aqueous dispersion containing fine metal particles (P-6) in a concentration of 2.5% by weight in which the surface of the fine metal particles (P-6) was partly in the form of an oxide and/or a hydroxide.

Subsequently, the water was replaced with 4-hydroxy-4-methyl-2-pentanone. Thus, a 4-hydroxy-4-methyl-2-pentanone dispersion containing the partly surface-oxidized fine metal particles (P-6) in a concentration of 4.0% by weight was prepared.

The fine metal particles (P-6) obtained were evaluated for average particle diameter and charge quantity by streaming current titration with respect to the aqueous dispersion after oxidation. The results are shown in Table 1.

Example 7

An aqueous dispersion containing fine metal particles (P-2) in a concentration of 2.5% by weight in terms of metal concentration was prepared in the same manner as in Example 2.

Subsequently, the aqueous dispersion of the fine metal particles (P-2) was treated with Nanomizer System to prepare an aqueous monodisperse dispersion of the fine metal particles (P-2). This dispersion was placed in a rotary evaporator the atmosphere in which had been replaced with nitrogen gas. Thereafter, an aqueous hydrogen peroxide solution was charged thereinto as an oxidizing agent in an amount of 0.01 mol per mol of the sum of the metals of the fine metal particles to prepare, with stirring, an aqueous dispersion containing fine metal particles (P-7) in a concentration of 2.5% by weight in which the surface of the fine metal particles (P-2) was partly in the form of an oxide and/or a hydroxide.

Subsequently, the water was replaced with 4-hydroxy-4-methyl-2-pentanone. Thus, a 4-hydroxy-4-methyl-2-pentanone dispersion containing the partly surface-oxidized fine metal particles (P-7) in a concentration of 4.0% by weight was prepared.

The fine metal particles (P-7) obtained were evaluated for average particle diameter and charge quantity by streaming current titration with respect to the aqueous dispersion after oxidation. The results are shown in Table 1.

Example 8

An aqueous dispersion containing fine metal particles (P-8) in a concentration of 2.5% by weight was prepared in the same manner as in Example 7, except that the aqueous hydrogen peroxide solution as oxidizing agent was used in an amount of 0.02 mol per mol of the sum of the metals of the fine metal particles.

Subsequently, the water was replaced with 4-hydroxy-4-methyl-2-pentanone. Thus, a 4-hydroxy-4-methyl-2-pentanone dispersion containing the partly surface-oxidized fine metal particles (P-8) in a concentration of 4.0% by weight was prepared.

The partly surface-oxidized fine metal particles (P-8) obtained were evaluated for average particle diameter and charge quantity by streaming current titration with respect to the aqueous dispersion after oxidation. The results are shown in Table 1.

Example 9

To 100 g of pure water were added 8.77 g ($3.6 \times 10^{-2}$ mol) of ruthenium chloride dihydrate and 0.091 g ($3.77 \times 10^{-4}$ mol) of iron citrate so as to result in the proportion by weight in terms of metal shown in Table 1. Thus, an aqueous solution of mixed metal salts was prepared. Subsequently, 200 g (0.218 mol: 6 mol/mol-metals) of an aqueous solution containing trisodium citrate in a concentration of 30% by weight was added as a stabilizer to this aqueous solution of mixed metal salts. Thereto was then added 43.8 g (0.362 mol: 10 mol/mol-metals) of an aqueous solution containing sodium borohydride in a concentration of 25% by weight as a reducing agent. This mixture was stirred at a temperature of 20° C. in a nitrogen atmosphere for 1 hour to prepare a dispersion of fine metal particles (P-9).

From the dispersion obtained, the fine metal particles were separated and recovered with a centrifugal separator. These fine metal particles were washed with 6.1 g of an aqueous solution containing hydrochloric acid in a concentration of 1% by weight and then dispersed in pure water to prepare an aqueous dispersion containing the fine metal particles (P-9) in a concentration of 2.5% by weight in terms of metal.

Subsequently, the aqueous dispersion of the fine metal particles (P-9) was treated with Nanomizer System to prepare an aqueous monodisperse dispersion of the fine metal particles (P-9). This dispersion was placed in a rotary evaporator the atmosphere in which had been replaced with nitrogen gas. Thereafter, an aqueous hydrogen peroxide solution was charged thereinto in an amount of 0.02 mol per mol of the sum of the metals of the fine metal particles to prepare, with stirring, an aqueous dispersion containing fine metal particles (P-9) in a concentration of 2.5% by weight in which the surface of the fine metal particles (P-9) was partly in the form of an oxide and/or a hydroxide.

Subsequently, the water was replaced with 4-hydroxy-4-methyl-2-pentanone. Thus, a 4-hydroxy-4-methyl-2-pentanone dispersion containing the partly surface-oxidized fine metal particles (P-9) in a concentration of 4.0% by weight was prepared.

The fine metal particles (P-9) obtained were evaluated for average particle diameter and charge quantity by streaming current titration with respect to the aqueous dispersion after oxidation. The results are shown in Table 1.

Comparative Example 1

To 100 g of pure water was added 9.6 g ($3.6 \times 10^{-2}$ mol) of palladium nitrate dihydrate to prepare an aqueous metal salt solution. Subsequently, 198 g (0.216 mol: 6 mol/mol-metals) of trisodium citrate having a concentration of 30% by weight was added as a stabilizer to this aqueous solution. Thereto was then added 80 g ($7.2 \times 10^{-2}$ mol: 2 mol/mol-metal) of an aqueous solution containing ferrous sulfate in a concentration of 25% by weight as a reducing agent. This mixture was stirred at a temperature of 20° C. in a nitrogen atmosphere for 20 hours to prepare a dispersion of fine metal particles (P-10).

From the dispersion obtained, the fine metal particles were separated and recovered with a centrifugal separator. These fine metal particles were washed with 6.1 g of an aqueous solution containing hydrochloric acid in a concentration of 1% by weight and then dispersed in pure water to prepare an aqueous dispersion containing the fine metal particles (P-10) in a concentration of 2.5% by weight in terms of metal.

Subsequently, the aqueous dispersion of the fine metal particles (P-10) was treated with Nanomizer System to prepare an aqueous monodisperse dispersion of the fine metal particles (P-10). This dispersion was placed in a rotary evaporator the atmosphere in which had been replaced with nitrogen gas. The water was replaced with 4-hydroxy-4-methyl-2-pentanone. Thus, a 4-hydroxy-4-methyl-2-pentanone dispersion containing the fine metal particles (P-10) in a concentration of 4.0% by weight was prepared.

The fine metal particles (P-10) obtained were evaluated for average particle diameter and charge quantity by streaming current titration in the same manners as in Example 1. The results are shown in Table 1. The average particle diameter was large as compared with the particle diameter of 5 μm which was separately determined after the Nanomizer treatment from a TEM photograph. The fine metal particles had aggregated.

Comparative Example 2

An aqueous dispersion containing fine metal particles (P-10) in a concentration of 2.5% by weight in terms of metal was prepared in the same manner as in Comparative Example 1.

Subsequently, the aqueous dispersion of the fine metal particles (P-10) was treated with Nanomizer System to prepare an aqueous monodisperse dispersion of the fine metal particles (P-10). This dispersion was placed in a rotary evaporator the atmosphere in which had been replaced with nitrogen gas. Thereafter, oxygen was forced thereinto in an amount of 0.02 mol per mol of the sum of the metal of the fine metal particles to prepare, with stirring, an aqueous dispersion containing fine metal particles (P-11) in a concentration of 2.5% by weight in which the surface of the fine metal particles (P-10) was partly in the form of an oxide and/or a hydroxide.

Subsequently, the water was replaced with 4-hydroxy-4-methyl-2-pentanone. Thus, a 4-hydroxy-4-methyl-2-pentanone dispersion containing the partly surface-oxidized fine metal particles (P-11) in a concentration of 4.0% by weight was prepared.

The fine metal particles (P-11) obtained were evaluated for average particle diameter and charge quantity by streaming current titration in the same manners as in Example 1. The results are shown in Table 1. The average particle diameter was large as compared with the particle diameter of 5 μm which was separately determined after the Nanomizer treatment from a TEM photograph. The fine metal particles had aggregated.

Comparative Example 3

To 100 g of pure water were added 9.6 g ($3.6 \times 10^{-2}$ mol) of palladium nitrate dihydrate and 0.79 g ($3.23 \times 10^{-3}$ mol) of iron citrate so as to result in the proportion by weight in terms of metal shown in Table 1. Thus, an aqueous solution of mixed metal salts was prepared. Subsequently, 216 g (0.235 mol: 6 mol/mol-metals) of an aqueous solution containing trisodium citrate in a concentration of 30% by weight was added as a stabilizer to this aqueous solution of mixed metal salts. Thereto was then added 86.7 g ($7.8 \times 10^{-2}$ mol: 2 mol/mol-metals) of an aqueous solution containing ferrous sulfate in a concentration of 25% by weight as a reducing agent. This mixture was stirred at a temperature of 20° C. in a nitrogen atmosphere for 20 hours to prepare a dispersion of fine metal particles (P-12).

From the dispersion obtained, the fine metal particles were separated and recovered with a centrifugal separator. These fine metal particles were washed with 6.1 g of an aqueous solution containing hydrochloric acid in a concentration of 1% by weight and then dispersed in pure water to prepare an aqueous dispersion containing the fine metal particles (P-12) in a concentration of 2.5% by weight in terms of metal.

Subsequently, the aqueous dispersion of the fine metal particles (P-12) was treated with Nanomizer System to prepare an aqueous monodisperse dispersion of the fine metal particles (P-12). This dispersion was placed in a rotary evaporator the atmosphere in which had been replaced with nitrogen gas. The water was replaced with 4-hydroxy-4-methyl-2-pentanone. Thus, a 4-hydroxy-4-methyl-2-pentanone dispersion containing the fine metal particles (P-12) in a concentration of 4.0% by weight was prepared.

The fine metal particles (P-12) obtained were evaluated for average particle diameter and charge quantity by streaming current titration in the same manners as in Example 1. The results are shown in Table 1.

Comparative Example 4

An aqueous dispersion containing fine metal particles (P-12) in a concentration of 2.5% by weight in terms of metal was prepared in the same manner as in Comparative Example 3.

Subsequently, the aqueous dispersion of the fine metal particles (P-12) was treated with Nanomizer System to prepare an aqueous monodisperse dispersion of the fine metal particles (P-12). This dispersion was placed in a rotary evaporator the atmosphere in which had been replaced with nitrogen gas. Thereafter, oxygen was forced thereinto in an amount of 0.02 mol per mol of the sum of the metals of the fine metal particles to prepare, with stirring, an aqueous dispersion containing fine metal particles (P-13) in a concentration of 2.5% by weight in which the surface of the fine metal particles (P-12) was partly in the form of an oxide and/or a hydroxide.

Subsequently, the water was replaced with 4-hydroxy-4-methyl-2-pentanone. Thus, a 4-hydroxy-4-methyl-2-pentanone dispersion containing the partly surface-oxidized fine metal particles (P-13) in a concentration of 4.0% by weight was prepared.

The fine metal particles (P-13) obtained were evaluated for average particle diameter and charge quantity by streaming current titration with respect to the aqueous dispersion after oxidation. The results are shown in Table 1.

Comparative Example 5

To 100 g of pure water was added 6.1 g ($3.6 \times 10^{-2}$ mol) of silver nitrate-to prepare an aqueous silver nitrate solution. Subsequently, 198 g (0.216 mol: 6 mol/mol-metal) of an aqueous solution containing trisodium citrate in a concentration of 30% by weight was added as a stabilizer to this aqueous silver nitrate solution. Thereto was then added 80 g (7.2× $10^{-2}$ mol:2 mol/mol)-of an aqueous solution containing ferrous sulfate in a concentration of 25% by weight as a reducing agent. This mixture was stirred at a temperature of 20° C. in a nitrogen atmosphere for 1 hour to prepare a dispersion of fine metal particles (P-14).

From the dispersion obtained, the fine metal particles were separated and recovered with a centrifugal separator. These fine metal particles were washed with 6.1 g of an aqueous solution containing hydrochloric acid in a concentration of 1% by weight and then dispersed in pure water to prepare an aqueous dispersion containing the fine metal particles (P-14) in a concentration of 2.5% by weight in terms of metal.

Subsequently, the aqueous dispersion of the fine metal particles (P-14) was treated with Nanomizer System to prepare an aqueous monodisperse dispersion of the fine metal particles (P-14). This dispersion was placed in a rotary evaporator the atmosphere in which had been replaced with nitrogen gas. Thereafter, oxygen was, forced thereinto in an amount of 0.02 mol per mol of the metal of the fine metal particles to prepare, with stirring, an aqueous dispersion of fine metal particles (P-14) in which the surface of the fine metal particles (P-14) was partly in the form of an oxide and/or a hydroxide.

Subsequently, the water was replaced with 4-hydroxy-4-methyl-2-pentanone. Thus, a 4-hydroxy-4-methyl-2-pentanone dispersion containing the partly surface-oxidized fine metal particles (P-14) in a concentration of 4.0% by weight was prepared.

The fine metal particles (P-14) obtained were evaluated for average particle diameter and charge quantity by streaming current titration. The results are shown in Table 1.

Comparative Example 6

To 100 g of pure water were added 6.1 g ($3.6 \times 10^{-2}$ mol) of silver nitrate and 0.8 g ($3.23 \times 10^{-3}$ mol) of iron citrate so as to result in the metal proportion by weight shown in Table 1. Thus, an aqueous solution of mixed metal salts was prepared. Subsequently, 216 g (0.236 mol: 6 mol/mol-metals) of an aqueous solution containing trisodium citrate in a concentration of 30% by weight was added as a stabilizer to this aqueous solution of mixed metal salts. Thereto was then added 87 g ($7.85 \times 10^{-2}$ mol: 2 mol/mol-metals) of an aqueous solution containing ferrous sulfate in a concentration of 25% by weight as a reducing agent. This mixture was stirred at a temperature of 20° C. in a nitrogen atmosphere for 1 hour to prepare a dispersion of fine-metal particles (P-15).

From the dispersion obtained, the fine metal particles were separated and recovered with a centrifugal separator. These fine metal particles were washed with 6.1 g of an aqueous solution containing hydrochloric acid in a concentration of 1% by weight and then dispersed in pure water to prepare an aqueous dispersion containing the fine metal particles (P-15) in a concentration of 2.5% by weight in terms of metal.

Subsequently, the aqueous dispersion of the fine metal particles (P-15) was treated with Nanomizer System to prepare an aqueous monodisperse dispersion of the fine metal particles (P-15). This dispersion was placed in a rotary evaporator the atmosphere in which had been replaced with nitrogen gas. Thereafter, oxygen was forced thereinto in an amount of 0.02 mol per mol of the sum of the metals of the fine metal particles to prepare, with stirring, an aqueous dispersion of fine metal particles (P-15) in which the surface of the fine metal particles (P-15) was partly in the form of an oxide and/or a hydroxide.

Subsequently, the water was replaced with 4-hydroxy-4-methyl-2-pentanone. Thus, a 4-hydroxy-4-methyl-2-pentanone dispersion containing the partly surface-oxidized fine metal particles (P-15) in a concentration of 4.0% by weight was prepared.

The fine metal particles (P-15) obtained were evaluated for average particle diameter and charge quantity by streaming current titration. The results are shown in Table 1. The average particle diameter was large as compared with the particle diameter of 6 μm which was separately determined after the Nanomizer treatment from a TEM photograph. The fine metal particles had aggregated.

Comparative Example 7

An aqueous dispersion containing fine metal particles (P-12) in a concentration of 2.5% by weight in terms of metal was prepared in the same manner as in Comparative Example 3.

Subsequently, the aqueous dispersion of the fine metal particles (P-12) was treated with Nanomizer System to prepare an aqueous monodisperse dispersion of the fine metal particles (P-12). This dispersion was placed in a rotary evaporator the atmosphere in which had been replaced with nitrogen gas. Thereafter, oxygen was forced thereinto in an amount of 0.4mol per mol of the sum of the metals of the fine metal particles to prepare, with stirring, an aqueous dispersion of fine metal particles (P-16) in which the surface of the fine metal particles (P-12) was partly in the form of an oxide and/or a hydroxide.

Subsequently, the water was replaced with 4-hydroxy-4-methyl-2-pentanone. Thus, a 4-hydroxy-4-methyl-2-pentanone dispersion containing the partly surface-oxidized fine metal particles (P-16) in a concentration of 4.0% by weight was prepared.

The fine metal particles (P-16), obtained were evaluated for average particle diameter and charge quantity by streaming current titration. The results are shown in Table 1. The average particle diameter was large as compared with the particle diameter of 5 μm which was separately determined after the Nanomizer treatment from a TEM photograph. The fine metal particles had aggregated.

TABLE 1

| | Fine particles No. | Composition of metal salt solution prepared | | | | Reducing agent | | Oxidizing agent | | Composition of fine metal particles yielded | | | | Average Particle diameter nm | Flow electrical current potential μeq/g |
|---|---|---|---|---|---|---|---|---|---|---|---|---|---|---|---|
| | | Fe wt % | Ag wt % | Pd wt % | Ru wt % | Kind | Amount mol/mol-metal | Kind | Amount mol/mol-metal | Fe wt % | Ag wt % | Pd wt % | Ru wt % | | |
| Ex. 1 | P-1 | 0.6 | — | 99.4 | — | ferrous iron | 2 | — | — | 0.5 | — | 99.5 | — | 4 | 100 |
| Ex. 2 | P-2 | 0.6 | 99.4 | — | — | ferrous iron | 1 | — | — | 0.5 | 99.5 | — | — | 5 | 80 |
| Ex. 3 | P-3 | 0.6 | 9.9 | 89.5 | — | ferrous iron | 2 | — | — | 0.5 | 9.9 | 89.6 | — | 4 | 90 |
| Ex. 4 | P-4 | 0.1 | — | 99.9 | — | ferrous iron | 2 | $O_2$ | 0.02 | 0.1 | — | 99.9 | — | 5 | 120 |
| Ex. 5 | P-5 | 0.6 | — | 99.4 | — | ferrous iron | 2 | $O_2$ | 0.1 | 0.5 | — | 99.5 | — | 5 | 180 |
| Ex. 6 | P-6 | 1.1 | — | 98.9 | — | ferrous iron | 2 | $O_2$ | 0.02 | 1.0 | — | 99.0 | — | 5 | 200 |
| Ex. 7 | P-7 | 0.6 | 99.4 | — | — | ferrous iron | 1 | $H_2O_2$ | 0.01 | 0.5 | 99.5 | — | — | 7 | 170 |
| Ex. 8 | P-8 | 0.6 | 99.4 | — | — | ferrous iron | 1 | $H_2O_2$ | 0.02 | 0.5 | 99.5 | — | — | 10 | 180 |
| Ex. 9 | P-9 | 0.6 | — | — | 99.4 | sodium borohydride | 10 | $H_2O_2$ | 0.02 | 0.5 | — | — | 99.5 | 15 | 180 |
| Comp. Ex. 1 | P-10 | — | — | 100 | — | ferrous iron | 2 | — | — | 0.05 | — | 99.95 | — | 300 | 40 |
| Comp. Ex. 2 | P-11 | — | — | 100 | — | ferrous iron | 2 | $O_2$ | 0.02 | 0.05 | — | 99.95 | — | 200 | 40 |
| Comp. Ex. 3 | P-12 | 4.5 | — | 95.5 | — | ferrous iron | 2 | — | — | 4.00 | — | 96.0 | — | 4 | 260 |
| Comp. Ex. 4 | P-13 | 4.5 | — | 95.5 | — | ferrous iron | 2 | $O_2$ | 0.02 | 4.00 | — | 96.0 | — | 5 | 280 |
| Comp. Ex. 5 | P-14 | — | 100 | — | — | ferrous iron | 2 | $O_2$ | 0.02 | 0.05 | 99.5 | — | — | 5 | 50 |
| Comp. Ex. 6 | P-15 | 4.5 | 95.5 | — | — | ferrous iron | 2 | $O_2$ | 0.02 | 4.00 | 96.0 | — | — | 250 | 40 |
| Comp. Ex. 7 | P-16 | 4.5 | — | 95.5 | — | ferrous iron | 2 | $O_2$ | 0.4 | 4.00 | — | 96.0 | — | 500 | 30 |

Examples 10 to 18 and Comparative Examples 8 to 14 a) Preparation of Matrix-Forming Ingredient Liquid (M)

A mixed solution consisting of 50 g of ethyl orthosilicate ($SiO_2$: 28% by weight), 194.6 g of ethanol, 1.4 g of concentrated nitric acid, and 34 g of pure water was stirred at room temperature for 5 hours to obtain a liquid (M) containing a matrix-forming ingredient in an $SiO_2$ concentration of 5% by weight.

b) Preparation of Coating Liquids for Forming Transparent Conductive Coating Film Seven parts by weight of each of the 4-hydroxy-4-methyl-2-pentanone dispersions (P-1) to (P-16) shown in Table 1 was mixed with 1.1 part by weight of the matrix-forming ingredient liquid (M), 81.9 parts by weight of ethanol, 10 parts by weight of butyl Cellosolve, and 0.005 parts by weight of citric acid. Thus, coating liquids for transparent conductive coating film formation (C-1) to (C-16) each having a solid concentration of 0.335% by weight were prepared.

Evaluation of Coating Liquid Stability

Each of the coating liquids for transparent conductive coating film formation was held at 50° C. for 24 hours and then examined for a precipitate. The coating liquids which had no precipitate were examined for particle size distribution with a Microtrac particle size analyzer (9340-UPA, manufactured by Nikkiso Co., Ltd.). Stability was evaluated based on the following criteria. The results are shown in Table 2.

Evaluation Criteria:

No precipitate and no change in particle diameter: ⊚

No precipitate, slight change in particle diameter: ○

No precipitate, considerable change in particle diameter: Δ

Precipitate observed: X c) Preparation of Coating Liquid for Forming Transparent Coating Film An ethanol/butanol/diacetone alcohol/isopropanol (2:1:1:5 by weight) mixed solvent was added to the matrix-forming ingredient liquid (M) to prepare a coating liquid for transparent coating film formation having an $SiO_2$ concentration of 1%-by weight.

d) Production of Panel Glasses with Transparent Conductive Coating Film

Each of the coating liquids for transparent conductive coating film formation (C-1) to (C-16) was applied to a surface of a panel glass (14 inches) for cathode ray tubes by spinner coating while keeping the surface at 40° C. under the conditions of 150 rpm and 90 seconds so as to give a transparent conductive coating film having a thickness of 20 nm. Each coating liquid applied was dried.

Subsequently, the coating liquid for transparent coating film formation was likewise applied on the transparent conductive fine-particle layers thus formed, by spinner coating under the conditions of 100 rpm and 90 seconds so as to give a transparent coating film having a thickness of 100 nm. The coating liquid applied was dried and then burned at 160° C. for 30 minutes. Thus, substrates with transparent conductive coating film were obtained.

The substrates with transparent conductive coating film obtained were subjected to the following evaluations.

Surface Resistance, Haze, and Transmittance

These substrates with transparent conductive coating film were examined for surface resistance with a surface resistance meter (LORESTA, manufactured by Mitsubishi Petrochemical Co., Ltd.) and for haze with a haze computer (3000A, manufactured by Nippon Denshoku Co., Ltd.).

Transmittance was measured with a spectrophotometer (HI-VIS V-560, manufactured by Japan Spectroscopic Co., Ltd.).

Scratch Strength (1)

A standard test needle (manufactured by Rockwell Co., Ltd.; hardness, HRC-60; φ=0.5 mm) was set on the transparent coating film of each substrate with transparent conductive coating film. A load of 1 kg was applied thereto and the needle was moved in a stroke of 30 to 40 mm. Thereafter, the coating film surface was visually examined from a distance of 45 cm while illuminating the surface at 1,000 lx.

No scratch mark was observed: ⊚

Reflection color changed (from purple to red) in fluorescent light: ○

No reflection color in fluorescent light, and scratch mark was observed: Δ

Base (glass substrate) was seen through: X

Durability

Durability was evaluated with respect to the following items (1) to (4).

(1) Color Change (HCl)

The substrates with transparent conductive coating film obtained above were immersed for 72 hours in an aqueous solution containing HCl in a concentration of 10% by weight and then examined for transmittance. This transmittance was compared with the transmittance before the treatment, and the color change was evaluated based on the following criteria.

Transmittance change (%)={(transmittance before treatment)−(transmittance after treatment)}/(transmittance before treatment)

Transmittance change, from 0 to less than 1%: ○

Transmittance change, from 1 to less than 5%: Δ

Transmittance change, 5% or more: X (2) Color Change ($H_2O_2$)

The substrates with transparent conductive coating film obtained above were immersed for 72 hours in an aqueous solution containing $H_2O_2$ in a concentration of 10% by weight and then examined for transmittance. This transmittance was compared with the transmittance before the treatment, and the color change was evaluated based on the same criteria as shown above.

(3) Scratch Strength (2)

The coated substrates were treated in the same manner as in the Color Change ($H_2O_2$) and then examined for scratch strength.

(4) Surface Resistance (2)

The coated substrates were treated in the same manner as in the Color Change ($H_2O_2$) and then examined for surface resistance.

The results are shown together in Table 2.

TABLE 2

| | | | Substrate with transparent conductive coating film | | | | | |
|---|---|---|---|---|---|---|---|---|
| | | | | | | Durability | | |
| | Stability of coating | Surface resistivity | | | Scratch | Surface resistance | Color change | Scratch |
| | liquid | (Ω/□) | transmittance % | Haze % | strength | (Ω/□) | HCl H$_2$O$_2$ | strength |
| Ex. 10 | ○ | 1,000 | 85 | 0.1 | ○ | 1,050 | ○ ○ | ○ |
| Ex. 11 | ○ | 600 | 82 | 0.1 | ○ | 660 | ○ ○ | ○ |
| Ex. 12 | ○ | 800 | 85 | 0.1 | ○ | 830 | ○ ○ | ○ |
| Ex. 13 | ◎ | 1,500 | 85 | 0.1 | ○ | 1,500 | ○ ○ | ○ |
| Ex. 14 | ◎ | 2,000 | 85 | 0.1 | ○ | 2,020 | ○ ○ | ○ |
| Ex. 15 | ◎ | 2,000 | 85 | 0.1 | ○ | 2,020 | ○ ○ | ○ |
| Ex. 16 | ◎ | 800 | 82 | 0.1 | ○ | 820 | ○ ○ | ○ |
| Ex. 17 | ◎ | 1,000 | 82 | 0.1 | ○ | 1,020 | ○ ○ | ○ |
| Ex. 18 | ◎ | 2,000 | 82 | 0.1 | ○ | 2,010 | ○ ○ | ○ |
| Comp. Ex. 8 | X | 3,000 | 87 | 0.2 | X | 3,650 | X X | — |
| Comp. Ex. 9 | Δ | 5,000 | 85 | 0.3 | X | 5,630 | X Δ | — |
| Comp. Ex. 10 | ◎ | 5,000 | 87 | 0.3 | Δ | 5,350 | Δ X | X |
| Comp. Ex. 11 | ◎ | 8,000 | 85 | 0.3 | Δ | 8,500 | Δ Δ | X |
| Comp. Ex. 12 | X | 1,000 | 87 | 2.0 | X | 1,370 | X Δ | — |
| Comp. Ex. 13 | X | 3,000 | 87 | 3.0 | X | 3,100 | X X | — |
| Comp. Ex. 14 | X | 20,000 | 88 | 5.0 | X | 20,400 | X Δ | — |

The results given above show the following. The substrates which have a transparent conductive coating film containing fine metal particles of the invention have high durability and high scratch strength. Furthermore, the coating liquids prepared in Examples 4 to 9 (Examples 13 to 18) are characterized by having high stability and a long pot life.

While the invention has been described in detail and with reference to specific embodiments thereof, it will be apparent to one skilled in the art that various changes and modifications can be made therein without departing from the spirit and scope thereof.

This application is based on a Japanese patent application filed on Mar. 30, 2001 (Patent Application 2001-100356), the contents thereof being hereby incorporated by reference.

According to the invention, since the fine metal particles contain iron in a small amount within a specific range, not only the particles retain high conductivity but also have properties similar to properties of iron-containing alloys. The fine metal particles, when used for forming a conductive coating film, can inhibit the noniron metal from oxidizing or ionizing and inhibits particle growth. The film can hence be inhibited from suffering a decrease in conductivity or light transmittance. Furthermore, the fine metal particles the surface of which has been oxidized show a high flow electrical current potential and are excellent in dispersibility and stability.

The coating liquid for transparent conductive coating film formation, which contains such fine metal particles, has a long pot life. When this coating liquid for transparent conductive coating film formation is used, a substrate with transparent conductive coating film having a transparent conductive coating film can be obtained which is excellent in conductivity and electromagnetic shielding properties and has high reliability. Furthermore, since the fine metal particles are excellent in dispersibility and stability, the amount of an organic stabilizer to be used can be reduced and the removal of the organic stabilizer after coating film formation is easy. The organic stabilizer can hence be inhibited from remaining to impair conductivity. In addition, there is no need of burning the substrate at a temperature as high as 400° C. or above after coating film formation in order to remove the organic stabilizer as in related-art techniques, and the organic stabilizer can be removed at a low temperature. Consequently, not only the aggregation or fusion of fine metal particles which occurs in high-temperature burning can be prevented, but also the coating film obtained can be prevented from having an impaired haze.

According to the process of the invention for producing fine metal particles, the fine metal particles described above can be efficiently obtained.

According to the invention, a coating liquid for transparent conductive coating film formation can be obtained which has a long pot life and can form a transparent conductive coating film excellent in conductivity and electromagnetic shielding properties and having high reliability.

Furthermore, according to the invention, a substrate with transparent conductive coating film can be obtained which has a transparent conductive coating film excellent in conductivity and electromagnetic shielding properties and having high reliability.

When this substrate with transparent conductive coating film is used as the front panel of a display device, the display device obtained can have excellent anti-reflection properties as well as excellent electromagnetic shielding properties.

The invention claimed is:

1. Fine metal particles suitable for making a substantially transparent conductive coating film comprising iron and non-iron metal, characterized by having an average particle diameter in the range of from 2 to 70 nm and an iron content in the range of from 0.1 to 2.0% by weight, and further characterized in that an aqueous dispersion in which the concentration of the fine metal particles is 0.5% by weight has a charge quantity by streaming current titration in the range of from 60 to 200 μeq/g.

2. The fine metal particles as claimed in claim 1, characterized in that the noniron metal is one or more metals selected from the group consisting of Au, Ag, Pd, Pt, Rh, Ru, Cu, Ni, Co, Sn, Ti, In, Al, Ta, and Sb.

3. The fine metal particles as claimed in claim 1, characterized in that part of the surface of the fine metal particles is in the form of an oxide and/or a hydroxide.

4. The fine metal particles as claimed in claim 2, characterized in that part of the surface of the fine metal particles is in the form of an oxide and/or a hydroxide.

* * * * *